United States Patent [19]

Henriksen

[11] Patent Number: 5,059,477
[45] Date of Patent: Oct. 22, 1991

[54] PROTECTIVE GARMENT

[76] Inventor: Henning R. Henriksen, 25, Dronningensgade, Copenhagen, Denmark, DK-1420

[21] Appl. No.: 785,094
[22] PCT Filed: Oct. 4, 1985

Related U.S. Application Data

[63] Continuation of Ser. No. 557,159 filed as PCT DK83/00034 on Mar. 14, 1983, published as WO83/03205 on Sep. 29, 1983, abandoned.

[30] Foreign Application Priority Data

Mar. 12, 1982 [DK] Denmark ............................ 1112/82

[51] Int. Cl.$^5$ ............................................. B32B 27/08
[52] U.S. Cl. ................................... 428/220; 428/333; 428/516; 2/159; 2/167
[58] Field of Search .............. 521/27; 428/516; 2/2.5, 2/51, 167, 168, 159; 604/381; 128/379, 380, 381; 169/48

[56] References Cited

U.S. PATENT DOCUMENTS

| | | | |
|---|---|---|---|
| 3,043,717 | 7/1962 | Budde, Jr. | 117/138.9 |
| 3,560,325 | 2/1971 | Sogi | 428/516 |
| 4,036,233 | 7/1977 | Kozak | 604/381 |
| 4,064,296 | 12/1977 | Bornstein | 428/516 |
| 4,156,753 | 5/1979 | Tanaka | 604/381 |
| 4,214,321 | 7/1980 | Nuwayser | 2/167 |
| 4,239,826 | 12/1980 | Knott | 428/516 |
| 4,254,169 | 3/1981 | Schroeder | 428/516 |
| 4,405,325 | 9/1983 | Antlfinger | 604/381 |
| 4,464,443 | 8/1984 | Farrell | 428/516 |
| 4,569,707 | 2/1986 | Johnson | 2/167 |

FOREIGN PATENT DOCUMENTS

| | | |
|---|---|---|
| 2330316 | 1/1974 | German Democratic Rep. |
| 577866 | 6/1946 | United Kingdom . |
| 1489635 | 10/1977 | United Kingdom . |

OTHER PUBLICATIONS

Spence, *Chemical Permeation Through Protective Clothing Material: An Evaluation of Several Critical Variables*, 1981 American Industrial Hygiene Conference, Portland, OR, May 25, 1981.

Hansen, *The Three Dimsnio nal Solubility Parameter—Key to Paint Component Affinities: I. Solvents, Plasticizers, Polymers, and Resins*, , Journal of Paint Technology, vol. 39, No. 505, Feb. 1967, pp. 104–117.

Hansen, "*The Three Dimensional Solubility Parameter—Key to Paint Component Affinites: II and III*", Journal of Paint Technology, vol 39, No. 511, Aug. 1967, pp. 505–514.

U. L. Christensen and H. R. Henriksen, *Chemicals, Protecting Gloves and Selection of Glove Materials*, The Danish Society of Industrial Medicine, Mar. 1981 (with English translation).

G. Calingaert and H. Shapiro. *Permeability of Protective Glove Materials to Tetraethyllead and Ethylene Bromide*, Industrial and Engineering Chemistry, vol. 40, No. 2, Feb. 1948, pp. 332–335.

Norton Company, Safety Products Division, Cellulose Acetate and Faceshield Visor Product Specifications, 1978 and 1979.

(List continued on next page.)

Primary Examiner—Fred Teskin
Attorney, Agent, or Firm—Bryan, Cave, McPheeters & McRoberts

[57] ABSTRACT

Improved polymer barrier for protective garments for personal protection gainst hazardous chemicals (e.g. epoxy products, organic solvents and pesticides) and a rational method of selecting polymer membranes with optimal permeation resistance against hazardous chemicals. As an excellent barrier against eopxy products and solvents a protective garment contains a membrane of a vinyl alcohol-ethylene copolymer. Said copolymer was selected by the invented optimization method (the three dimensional solubility parameter concept).

15 Claims, 2 Drawing Sheets

OTHER PUBLICATIONS

Kuraray Co., Ltd., Eval Sales Department, *Bi-Axially Oriented Eval Film*, Product Brochure.

Kurary Co., Ltd., Eval Company of America, *Kuraray Eval Resin*, Product Brochure, with (1) invoice dated Jan. 3, 1966 from Charleston Rubber Company to Continental Safety Equipment and (2) a letter dated Feb, 18, 1966 from Continental Safety Equipment to Charleston Rubber Company, attached thereto.

Becton Dickinson, Edmont Catalog, *Job-Fitted Gloves and Protective Clothing*, 1981.

ASTM Designation: D 3132-72, *Standard Method of Test for Solubility Range of Resins and Polymers*, Dec. 1971, pp. 1046-1051.

Notice of Distribution for *Materials for Protective Gloves*, Dated Aug. 10, 1987, executed by Bo-Goran Wallin and Peter Rostovanyi (with English translation).

Statement of W. Paaske, Principal, Directorate of National Labour Inspection, dated Dec. 9, 1987.

Swedish Defense Material Administrtion, Technical Provision-*Waxed Fabric Laminate* 300, KATF 53127 B, Jun 1964 (with English translation of first page).

Project Department of the Division of Polymer Technology, Royal Institute of Technology, Stockholm, Sweden, Calculation of *Solubility Parameter Set for Regenerated Cellulose*, Aug. 13, 1987 (with English translation).

PROTECTIVE GARMENT

This is a continuation of U.S. application Ser. No. 557,159, filed as PCT DK83/00034 on Mar. 14, 1983, published as WO83/03205 on Sep. 29, 1983, now abandoned.

FIELD OF THE INVENTION

The present invention relates to protective garments or clothings for the protection against the influence of chemicals.

BACKGROUND OF THE INVENTION

There is a great need for protective garments with a low permeability (i.e. a long breakthrough time and a low permeation rate) for certain chemical compounds or mixtures of compounds. The polymer membranes used in protective garments (e.g. gloves, coverall suits, hoods, boots, etc.) for use in a work environment or in the home must protect against chemical compounds or mixtures thereof which are hazardous to the health, such as solvents, paints, varnishes, glues, cleaning agents, degreasing agents, drilling fluids, or epoxy materials. Regarding protective clothing against hazardous chemicals in the work environment or the home, the main concern has previously been to obtain chemical resistance of the clothing, i.e. non-degradability. During the latest years strong concern about the permeability of protective clothing against chemicals has developed. Permeation studies have surprisingly shown that the breakthrough time is often less than half an hour, sometimes only a few minutes. The studies have also shown that the breakthrough time and the permeation rate is to a great extent dependent on the combination of the hazardous substances and the materials for protective clothing. In view of the foregoing, it is quite obvious that a great need exists for protective garments featuring polymer membranes without the aforementioned disadvantage. Unfortunately, no other method of selecting suitable combinations than the method of trial and error has been proposed. Epoxy materials and many solvents are particularly important in this context due to their toxic effects and allergenic properties on mammalian skin, in particular human skin.

SUMMARY OF THE INVENTION

The present invention relates to improved protective garments for protection against chemicals, in particular epoxy materials, and to a rational method of selecting polymer membranes with optimal permeation resistance against hazardous chemicals.

In connection with the research which led to the present invention the applicant has found that commonly used membrane materials (such as polyethylene, various rubbers, neoprene, silicone rubbers, etc.) have insufficient barrier properties with respect to e.g. epoxy materials, in that they have breakthrough times of an hour or less. Some of these membrane materials have even been suggested or recommended as materials for proctective garments by manufacturers of epoxy. Applicant has further found that the three-dimensional solubility parameter system pioneered and described by C. M. Hansen (cf. ref. 1, 2, 3 and 4) may suitably be used as a guide for the rational selection of suitable barrier membrane materials for protection garments.

The three solubility parameters termed $\delta_H$, $\delta_p$ and $\delta_D$, measured in $(cal/cm^3)^{\frac{1}{2}}$, quantify the molecular cohesive forces (the hydrogen bonding, polar and dispersion forces) in a given compound or mixture of compounds.

The so far commonly used membrane materials for protective garments have $\delta_H$- and $\delta_p$-values of about 3 or less, and $\delta_D$-values of about 9. In view of the low $\delta_H$- and $\delta_p$-values, these membrane materials are designated as low-energy type polymers because of the relatively low level of intermolecular cohesive forces. These solubility parameter values are fairly close to the solubility parameter values occupied by a major part of the commonly used solvents and epoxy materials.

It has now been found that polymer materials of the high-energy type, i.e. with solubility parameters considerably different from those so far commonly used, exhibit superior properties with regard to being impermeable to chemical compounds, e.g. epoxy materials.

The invention relates to a protective garment comprising a membrane comprising a substantially water insoluble polymer material having a solubility parameter set ($\delta_H$, $\delta_p$, $\delta_D$) which is positioned at a solubility parameter distance of at least 7 from the solubility parameter set ($\delta_H$, $\delta_p$, $\delta_D$) equal to (0,0,8).

DETAILED DESCRIPTION OF THE INVENTION

The distance A between the solubility parameter set of the chemical ($\delta_{HO}$, $\delta_{PO}$, $\delta_{DO}$) and the solubility parameter set of the polymer ($\delta_{HM}$, $\delta_{PM}$, $\delta_{DM}$) is defined as follows (cf. ref. 1 and 3):

$$A = ((\delta_{HM}-\delta_{HO})^2 + (\delta_{PM}-\delta_{PO})^2 + 4(\delta_{DM}-\delta_{DO})^2)^{\frac{1}{2}}$$

The parameter set of (0,0,8) is a suitable average representative of a large number of hazardous chemicals encountered in the metal industry, the construction industry, and the chemical industry. While it cannot be said that all hazardous chemicals contribute to this average (noteable exceptions are e.g. methanol and dimethyl sulfoxide), the hazardous chemicals which can be said for practical purposes to average at a parameter set of about (0,0,8) comprises by far the major number of hazardous organic solvents and plasticizers, polymerization monomers, pesticides and detergents. One particularly important group of hazardous chemicals of which the parameter set of (0,0,8) is representative are the above-mentioned epoxy materials. In the present context, the term "epoxy materials" designates two component types comprising a binder component which contains epoxy monomer, dimer, or trimer, commonly based on diglycidylether of bisphenol A, solvents such as ethylene, butanol, and butylacetat, and optionally pigments and fillers, and a hardener component containing polyaminoamides and optionally aromatic amines or aliphatic polyamines.

In the known art, solubility parameter system is primarily used for formulating paint coatings, i.e., for selecting solvents for particular binders. The principle is that a solvent is selected, the solubility parameter of which is as close as possible to the solubility parameter of the binder. Often, a solvent is selected which is constituted by a mixture of components, in which case the relevant solubility parameter set is the solubility parameter set of the mixture, which is calculated from the parameter set of the individual components by calculating each parameter in the set as the volume weighted average.

According to the present invention, the solubility parameter set, although calculated in the same manner, is used for a completely different purpose, i.e., for predicting a completely different combination of relative properties between two materials, i.e., the breakthrough time and the permeation rate of a fluid in a polymer membrane: It has been found that the greater the distance is between the solubility parameter set of the fluid and the polymer, the longer is the breakthrough time, and the lower is the permeation rate.

In practice, acceptable results with respect to increased breakthrough time and reduced permeation rate are obtained when the distance between the parameter set of (0,0,8) and the parameter set of the polymer, calculated as described above, is at least 7, preferably at least 9, in particular at least 11, and most preferred around 13.

Materials which comply with these conditions are the so-called high-energy polymer materials, i.e., polymer materials with high molecular cohesive forces, in particular high hydrogen-bonding and polar cohesive forces, while most known polymer membrane materials, including polymer membrane materials conventionally used for protective garments, are low-energy polymer materials (which typically are at a distance of 6 or lower from the solubility parameter set of (0,0,8)).

The synthetic polymer high-energy material is one which is substantially water-insoluble. This term includes materials which will undergo swelling in contact with water, but is intended to exclude materials which are actually soluble in water. An example of a high-energy material which is soluble in water is polyvinyl alcohol. Although polyvinyl alcohol shows a high breakthrough time and a low permeation rate for epoxy materials such as shown in the experimental section, and although polyvinyl alcohol has in fact been suggested as a membrane for a protective garment, vide German Offenlegungsschrift No. 2330316, the water soluble character of PVA results in a number of disadvantages which are believed to exclude its utility as a protective garment membrane for practical purposes:

The water solubility of PVA renders it subject to dissolution in contact with external aqueous media or in contact with sweat. Furthermore, even small amounts of water or moisture which will not directly dissolve a PVA membrane will tend to swell and plasticize the membrane to such an extent that it loses the permeation resistance properties it would otherwise possess in view of its position in the solubility parameter system. Moreover, in the practical processing of PVA, where large amounts of plasticizer must be used which will tend to increase the mobility of the PVA molecules and hence to increase the permeability.

A particularly interesting class of polymer materials for the purpose of the present invention are copolymers substantially free of plasticizers, since the presence of plasticizers increases the mobility of the polymer molecules and hence increases the permeability.

An especially interesting class of polymer materials are copolymers of a $C_{2-5}$ alkene substituted with up to 4 hydroxy groups and a $C_{2-5}$ alkene, or homopolymers of a $C_{3-5}$ alkene substituted with up to 4 hydroxy groups. The $C_{2-5}$ alkene is preferably ethylene.

A particularly useful copolymer is a vinyl alcohol-ethylene copolymer.

In the following, the designation "PVAE" is used to designate a vinyl alcohol-ethylene copolymer.

It is preferred that the vinyl alcohol-ethylene copolymer contains 40–80 mole per cent of vinyl alcohol and 20–60 mole per cent of ethylene. In particular, it is preferred that the vinyl alcohol-ethylene copolymer contains 65–75 mole per cent of vinyl alcohol and 25–35 mole per cent of ethylene.

Vinyl alcohol-ethylene copolymers are described, inter alia, in DE Auslegeschrift No. 22339806, GB Patent No. 1212569, GB Patent No. 1247114, and GB Patent No. 1489635. Vinyl alcohol-ethylene copolymers suited for the purposes of the present invention are produced, e.g., by Kuraray Company Limited, Osaka, Japan, and are available under the trade name "Kuraray EVAL". They are normally used as packing materials for food; the main reason for the suitability for this purpose is their resistance against permeation by oxygen and their capability of reducing the loss of aromas from the food.

As appears from the experimental section, the PVAE materials show unique advantages for the purpose of the present invention in that they show extremely long breakthrough time. In contrast to PVA, the PVAE materials may be produced and shaped into membranes without the use of plasticizers, but with excellent flexibility and plyability. In addition to the advantage the the PVAE membranes have an extremely long breakthrough time, they show the advantage of the main component in epoxy materials, DGBEA, does not wet PVAE materials, which is attributed to the fact that PVAE materials have a very high hydrogen binding parameter $\delta_H$ compared to DGEBA. This is of major importance in the practical use of the garments according to the invention and contributes to the high barrier effect of the PVAE materials because the contact area between the membrane and the epoxy material is then essentially reduced.

According to particular embodiment of the invention, the substantially water insoluble high energy polymer material is laminated with a layer of another polymer. Several advantages may be obtainable by laminating a layer of the high energy synthetic polymer used according to the present invention with another polymer such as a polyolefin, in particular polethylene or polypropylene:

PVAE materials exhibit some absorbtion of water. Water absorption in the PVAE material will to some extent reduce the barrier function of the PVAE membrane due to a certain plasticizing effect of the water. As a protective garment is subject to the influence of water from perspiration, an important type of laminate is one which comprises a polymer layer of a type which will reduce water permeation, such as polyethylene or polypropylene, for application against the skin. Another possibility is to laminate the other polymer to the outside of the high energy polymer for protection against external water such as rain or spray.

Some chemicals, e.g. amines and alcohols, are able to permeate PVAE rather easily, but are not capable of permeating polyethylene. Thus, a laminate comprising polyethylene and PVAE is an excellent barrier against both chemicals with high $\delta_H$, $\delta_p$ solubility parameters and chemicals with low $\delta_H$, $\delta_p$ parameters. PVAE/polyethylene laminates, therefore, provide a superior general protecting effect against hazardous chemicals, including epoxy products. Also, a layer of polyethylene laminated with a PVAE membrane enhances the mechanical properties of the protective membrane and therefore constitute an economic construction in view of the relatively high cost of PVAE compared to polyethylene.

In case of both prolonged wear of the garment or wearing at elevated temperatures as well under conditions subjecting the garment to influence from external water, it will be preferable that the substantially water-insoluble material having a solubility parameter set positioned at solubility parameter distance of at least 7 from the parameter set (0,0,8) constitutes at least one intermediary layer of the laminate, for instance being the central layer in a 3-layer laminate or being layers Nos. 2 and 4 in a 5-layer laminate.

In such a PE/PVAE/PE laminate, the PVAE layer is effectively protected against water, amines, and alcohols. The PE/PVAE/PE laminate in practical dimensions has excellent mechanical properties (flexibility, strength, and elongation).

The lamination may be performed by extrusion lamination in which the polymer materials are extruded together into one membrane without any aid to help the polymer materials adhere together. Extrusion lamination may also be performed with the use of an adhesive promoter such as an organometallic titanium compound, e.g., tetra-n-butyltitanate or tetra-i-propyltitanate. The lamination may also be aided by means of oxidizing one of the polymers, e.g., oxidized polyethylene film as described in reference 6. Another method is lamination with an adhesive. In this method, the individual polymer films are laminated together by means of a thin layer (a few microns) of an adhesive such as a modified polyoleofine, e.g. a modified polyethylene or a modified polypropylene such as the types manufactured by Mitsui Petrochemical Industry Company Ltd., Japan, under the trade name ADMER TM or by the Mitsubishi Petrochemical Company Ltd., Japan, under the trade name MODIC TM. Other useful adhesives are acrylic resinous adhesives and modified vinylic resinous adhesives, the use of which is described in reference 7. This method is especially useful if the polymers have such different cohesive characteristics that they do not adhere well to one another on their own, e.g. in the case of a vinyl alcohol-ethylene copolymer and polyethylene.

In order to avoid the possibility of pinholes in the high-energy polymer barrier layer of the membrane, this layer should have a thickness of at least 10 $\mu$m. In practice, the membrane will usually have a thickness in the range from about 25 $\mu$m to about 5000 $\mu$m. For disposable garments, such as gloves, a preferred thickness range is 25-200 $\mu$m, in particular 50-150 $\mu$m, especially about 100 $\mu$m. For garments for repeated use, a preferred thickness range is 300-1000 $\mu$m, especially 250-500 $\mu$m.

The protective garment of the invention may be a glove as mentioned of the disposable type, or of a type for repeated use, a hood for pretecting the face and head, a boot (both of the disposable type for covering shoes and of the rubber boot type), a coverall suit (both of the type with integral gloves, boots, and hood, and of the type with separate gloves, boots, or hood), or an apron.

For large garments subjected to mechanical influences such as coverall suits with integral hood, gloves, and boots, it is preferable that the garment is also laminated with a reinforcing layer, such as woven nylon.

When manufacturing garments or parts of garments the membrane material may be heat welded, cast (e.g. by immersion or dip-casting), pneumatically extruded, or sown (with subsequent covering of the seams).

Large suits or parts of suits may be lined with e.g. non-woven fibrous material in order to increase mechanical strength and to increase comfort.

The invention also relates to a method for the protection of mammalian skin against the influence of a chemical or mixture of chemicals, said method showing the features set out in any of claims 23-27.

DESCRIPTION OF THE DRAWINGS

In FIG. 3, the numerals 5 and 9 designate the same or different polyoleofines such as polyethylene or polypropylene, and 7 designates a vinyl alcohol-ethylene copolymer. Reference numerals 6 and 8 designate adhesive or adhesion promoter. Alternatively, the layers may be unified by e.g., co-extrusion.

In operation, a sample 34 of a fluid chemical is arranged on top of the membrane 24. Through the capillary tube 30, a current of helium gas is directed against the lower side of the membrane 24, from where the gas (together with any chemical which has permeated the membrane) is discharged through the capillary tube 32 for analysis in a mass spectrometer.

EXPERIMENTAL STUDIES

The breakthrough time of DGEBA in a series of low energy polymer materials and some high energy polymer materials and laminates of low energy materials with high energy materials was determined. From these determinations, the diffusion coefficient was determined by the so-called time lag method, the time lag diffusion coefficient $D_L$ being expressed as $$D_L = I^2/(6 \times \theta),$$

where I is the membrane thickness measured in cm, and $\theta$ is the time lag breakthrough time in sec.

Figure 4:
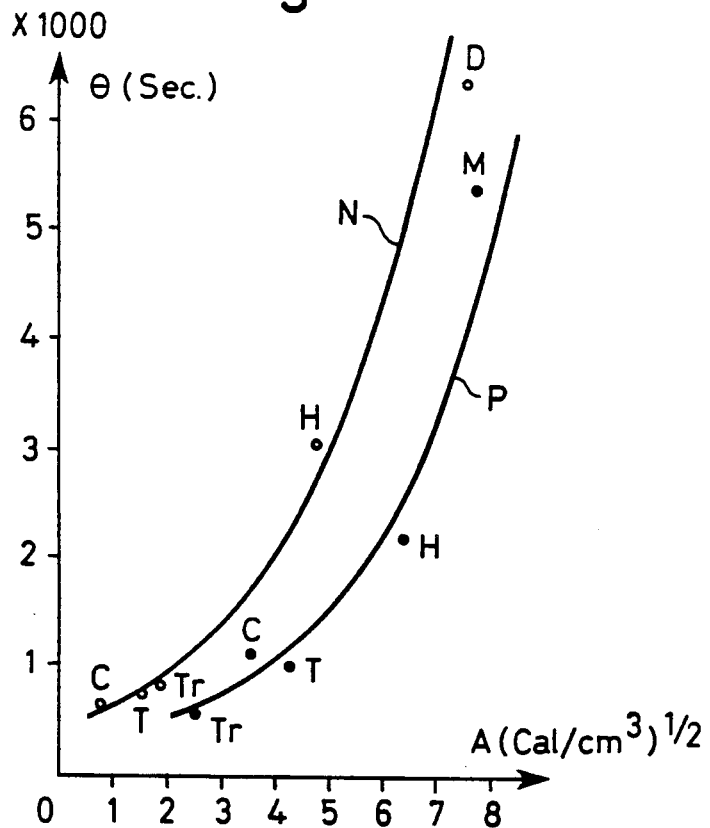
FIG. 4 illustrates the relation between the distance in solubility parameter (A) and the time lag breakthrough time with respect to Neoprene (N, plots •) and PVC (P, plots •) respectively. The individual plots correspond to the following chemicals: C: Chlorobenzene, D: dimethylsulphoxide, H: n-hexane, M: methanol, T: toluene, Tr: trichlorethylene. The curves N and P represent the time lag breakthrough times as a function of the solubility parameter distance between the polymer and the influencing chemical. It will be noted that at small distance, the time lage breakthrough time is less than 1000 seconds, whereas considerable improvements are obtained at distances of 5 and above, in particular at distances at 7 and above. In the actual case illustrated in FIG. 4, the thickness of the PVC membrane was 0.7 mm as opposed to 0.5 mm for the Neoprene membrane. The fact that the PVC-curve is lower than the Neoprene curve in spite of the greater thickness of the PVC-membrane reflects influence from the high proportion of plasticizer in the PVC-membrane.
Figure 1:
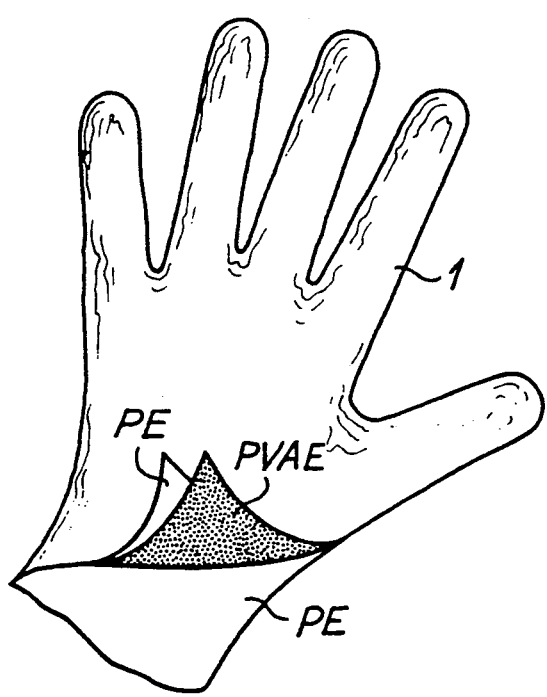
FIG. 1 illustrates a protective glove 1 according to the invention. The glove is made from a polyethylene/-vinyl alcohol-ethylene copolymer/-polyethylene laminate which, for illustration, is shown in a symbolic "de-laminated" fashion. The glove may, e.g. be made from two superimposed layers of laminate by heat sealing along the contour of the glove and simultaneously cutting. If desired, the glove may thereafter be turned inside out so that the seam is on the inside whereby dexterity is enhanced.
Figure 2:
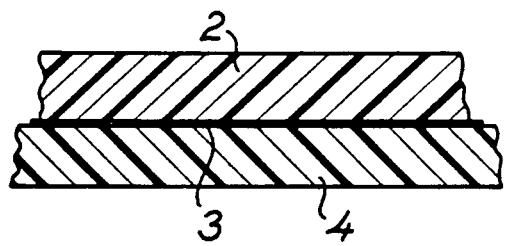
FIG. 2 shows a preferred laminate for a garment according to the invention. Reference numeral 2 designates a polyoleofine layer, preferably polyethylene or polypropylene, and reference numeral 4 designates a layer of vinyl alcohol-ethylene copolymer or another suitable high-energy polymer material. Reference numeral 3 designates an optional adhesive or adhesion promoter. Alternatively, the layers 2 and 4 may be unified by, e.g., co-extrusion.
Figure 3:
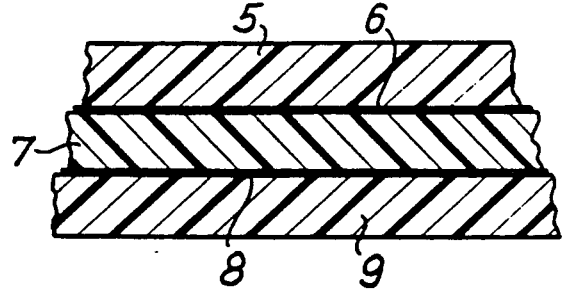
FIG. 3 illustrates another laminate for use in a garment according to the invention.
Figure 5:
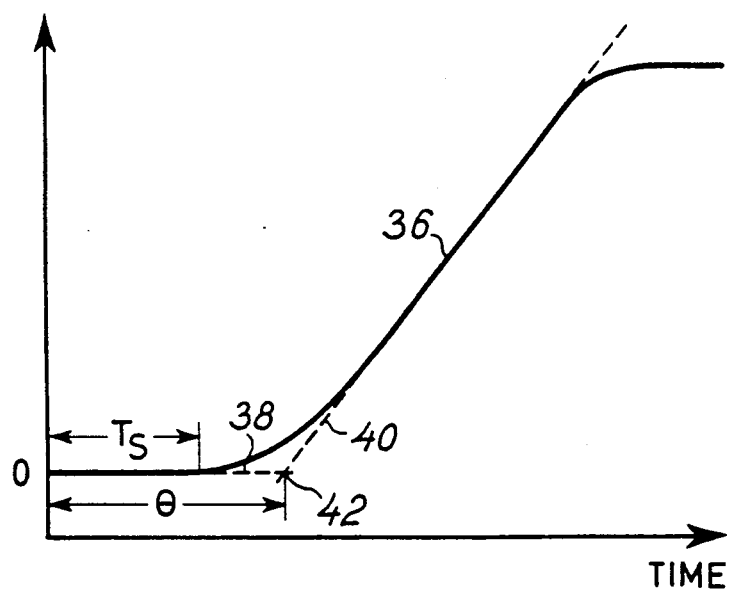
FIG. 5 illustrates the manner in which the time lag breakthrough time is calculated in the experimental section. The curve 36 shows the accumulated concentration of the compound in question behind the membrane as the function of the time. At the beginning, the accumulated concentration is zero and remains zero until the first trace of compound is detected at time $T_s$. Thereafter, the accumulated concentration increases and becomes a linear function of time until an equilibrium is reached. The symbol $\theta$ designates the time lag breakthrough time. This breakthrough time is determined from the extrapolations 38 and 40→42 shown in the figure. $T_s$ is determined at the actual detection limit. $T_s$ is therefore different from material to material and from experimental setup to experimental setup. which makes comparisons of the measured results difficult. $\theta$ is dependent of the detection limit in question and is therefore, among other reasons, a better basis for a comparison of membranes.

The basis of the time lag method is that the permeation rate of a substance that is brough into contact with a membrane becomes constant with time. This means that the concentration of the substance in question in a closed (detection) chamber on the desorption side, after a certain transition period, will become linearly increasing. Finally, in the case when the air in the chamber is saturated or when all of the material has been absorbed, the concentration will remain constant, cf. the typical time lag curve in FIG. 5.

Figure 6:
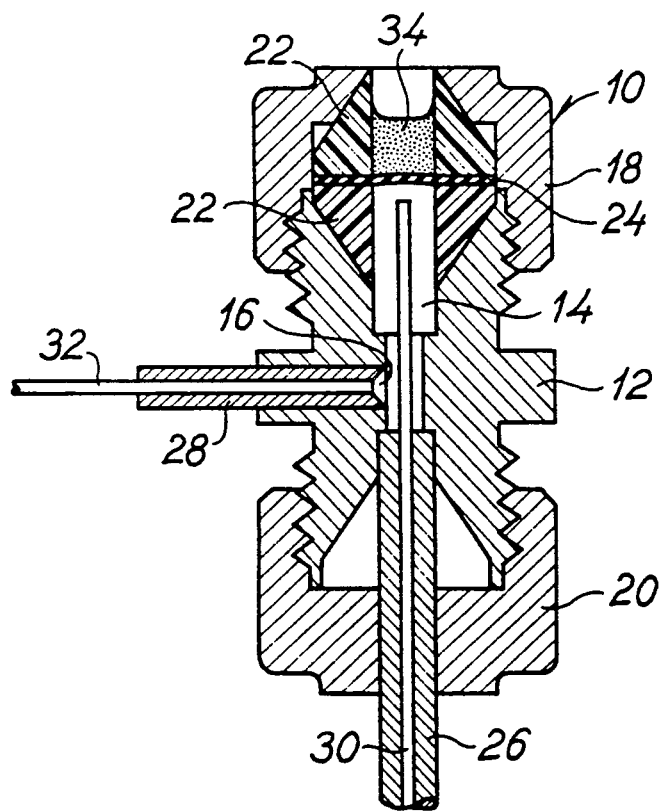
FIG. 6 illustrates a test cell used in the experimental section for monitoring the permeation through membranes. an axially extending central inlet bore 14 and, perpendicular thereon, an outlet bore 16. At each end, the central body is provided with screwed-on caps 18 and 20, respectively. The upper cap 18 secures two to oppositely arranged teflon cones 22 with central bore between which the membrane 24 to be tested is arranged. In the bores 14 and 16, bushings 26 and 28, respectively are arranged through which capillary tubes 30 and 32, respectively extend.

The measurements were performed with the aid of the test cell shown in FIG. 6, connected to a mass spectrometer. The instrumentation and the general procedure in the performance of the measurements are described in more detail in the literature (ref. 8).

The "outer" side of the membrane (absorption side) was covered with DGEBA (diglycidyl ether of bisphenol A). It was determined that the membrane was pinhole-free. The permeation of DGEBA was detected by mass spectroscopic analysis with respect to DGEBA vapor on the "instrument side" (desorption side) of the membrane. The permeation was determined on the basis of the intensity of the signal at the mass numbers 77, 91 and 94, the signal/noise ratio being best for these signals.

As the maximum measurement period, 240 min (4 hours) was chosen since this time interval corresponds to a working morning of uninterrupted contact with epoxy products.

During the measurements, the test cell was thermostated at 40° C.

MATERIALS

The content of impurities of the DGEBA used was less than 1% according to liquid chromatography.

Permeability measurements were performed on 14 different membranes. Four of these were specially produced. The others were made available as industrial warehouse products or finished experimental products. The membranes are specified in Table 1 and 1a. Membranes 1–10 were studied in an introductory series of tests, Nos. 11–15 in a concluding series of tests.

RESULTS

The results of the measurements are summarized in Table 2 and 2a. The time point $T_s$ for the first traces of DGEBA in the detection chamber was measured directly. The detection limit was 1 picomole/sec. The uncertainty of the breakthrough time $\theta$ is ±15%. The membranes studied were placed in the table according to increasing diffusion coefficient.

PVAE-1/PE was tested for permeability from both sides. After 335 min, the DGEBA had still not penetrated from the PE side. At the measurement after 1217 min, the substance had penetrated.

All membranes were kept completely wetted with DGEBA during the tests. No membranes swelled to any directly visible degree with the substance.

TABLE 1

| Material no. and type | Thickness (mm) | Form | Supplier: Product brand |
|---|---|---|---|
| 1 Polyethylene (PE) | 0.08 | Film | Allhabo, Sweden: Alloten LD |
| 2 Polychloroprene (neoprene, CR) | 0.54 | Plate | DuPont, USA: |
| 3 Silicone rubber (VSi) | 1.16 | Plate | DuPont, USA: |
| 4 Polyvinyl alcohol (PVA) | 0.07 | Film | Kurashiki, Japan: Vinylon |
| 5 Butyl rubber I (PIB, IIR) | 0.22 | Plate | Trelleborg, Sweden: 8700 |
| 6 Butyl rubber II (PIB, IIR) | 0.48 | Glove | Arsima, Arsima: 60951-3 |
| 7 Natural rubber (NR) | 1.1 | Plate | Schonning & Arve, Denmark: AT-1 |
| 8 Polyisoprene (PIP) | 1.1 | Plate | Schonning & Arve, Denmark: AT-2 |
| 9 Ethylene-propylene-terpolymer (EPDM) | 0.9 | Plate | Codan, Denmark: EPDM EJ-41* |
| 10 Chlorobutyl rubber/EPDM mixture | 1.32 | Plate | Codan, Denmark: Chlorobutyl/EPDM CB-13/ |
| 11 PE/PVAE-1/PE laminate[a] | 0.056 | Film | Kuraray Co. Ltd. Osaka, Japan: PE/EVAL-E/PE-coextruded film |
| 12 PVAE-1/PE laminate | 0.095 | Film | Kuraray Co. Ltd., Osaka, Japan: EVAL-E/PE-lami-film |
| 13 PVAE-1 | 0.020 | Film | Kuraray Co. Ltd., Osaka, Japan: EVAL-E |

TABLE 1-continued

| Material no. and type | Specification of membranes studied | | |
|---|---|---|---|
| | Thickness (mm) | Form | Supplier: Product brand |
| 14 PVAE-2 | 0.016 | Film | Kuraray Co. Ltd., Osaka, Japan: EVAL-F |

$^a$Three-layer laminate: polyethylene/vinyl alcohol-ethylene-copolymer/polyethylene.
*NR, PIP, EPDM and chlorobutyl rubber/EPDM plates (Nos. 7-10) were especially produced for this study.

TABLE 2

Membrane materials, time of first trace of DGEBA, breakthrough time, diffusion coefficient and solubility parameters

| DGEBA ("epoxymonomer") Membrane no. and materials | Membrane thickness (mm) | First trace of DGEBA, $T_s$ (min) | Break-through time for DGEBA, $\theta$ (min) | Diffusion coefficient. $D_L \times 10^8$ (cm$^2$/sec) | Solubility parameters | | | Reference (3) | Distance between parameter set DGEBA/material, A (cal/cm$^3$)$^{1/2}$ |
|---|---|---|---|---|---|---|---|---|---|
| | | | | | $\delta_H$ 5.51 | $\delta_P$ (cal/cm$^3$)$^{1/2}$ 5.88 | $\delta_D$ 9.95 | | |
| 4 Polyvinyl alcohol (PVA) | 0.07 | >240 | >240 | <0.057 | 13 | 7 | 8.5$^1$ | | 8.1$^4$ |
| 11 PE/PVAE-1/PE | 0.056 | >240 | >240 | <0.036 | 10.5 | 6.5 | 8.5$^1$ | | 5.8$^4$ |
| 12 PVAE-1/PE | 0.095 | >240 | >240 | <0.104 | 10.5 | 6.5 | 8.5$^1$ | | 5.8 |
| 13 PVAE-1 | 0.020 | >240 | >240 | <0.005 | 10.5 | 6.5 | 8.5$^1$ | | 5.8 |
| 14 PVAE-2 | 0.016 | >240 | >240 | <0.003 | 10.5 | 6.5 | 8.5$^1$ | | 5.8 |
| 1 Polyethylene (PE) | 0.08 | 2.0 | 4.4 | 4 | ~0 | ~0 | 8.1 | (10) | 8.9 |
| 5 Butyl rubber I (PIB, IIR) | 0.22 | 2.5 | 5.6 | 24 19 | 2.28 | 1.23 | 7.10 | (3) | 8.07 7.8 |
| 6 Butyl rubber II (PIB, IIR) | 0.48 | 25 | 46 | 14 | 1.6 | 1.1 | 7.8 | (11) | 7.58 |
| 2 Polychloroprene (neoprene, CR) | 0.54 | 16 | 38 | 21 | 1.3 | 1.5 | 9.5 | (11) | 6.2$^2$ |
| 10 Chlorobutyl/EPDM | 1.32 | 11 | 75 | 65 | — | — | — | | — |
| 7 Natural rubber (NR) | 1.10 | 7.3 | 24 | 140 | 3.5 | 1.0 | 9.0 | (11) | 5.6 5.6$^3$ |
| 8 Polyisoprene (PIP) | 1.10 | 6.5 | 24 | 140 | −0.40 | 0.69 | 8.10 | (3) | 8.8 |
| 9 Ethylenepropylen-ter-polymer (EPDM) | 0.90 | 2.5 | 15 | 152 | 1.0 | 0.4 | 8.8 | (11) | 7.5 |
| 3 Silicone rubber (VSi) | 1.16 | 7.5 | 19 | 197 | 2.2 | 1.8 | 8.0 | (11) | 6.6 |

$^1$The solubility parameters are, as far as is known, not established for PVA and PVAE. The values stated are estimated.
$^2$Secondary solubility range left out of consideration.
$^3$The solubility parameters for PIP (synthetic natural rubber) were determined with the aid of "raw elastomers" (ref. 3). The solubility parameters for NR (natural rubber) were determined with respect to vulcanized material. Since the membranes studied of both PIP and NR consists of vulcanized material, it appears reasonable to use the solubility parameters for NR in the distance calculations with respect to both material types.

DISCUSSION

The membrane thicknesses are of the same order of magnitude as those which occur in safety gloves. The measured breakthrough times $\theta$ and trace times $T_s$ therefore by themselves give an impression of the suitability of the material for safety gloves. Several membranes are of essentially the same thickness, which enables direct comparison of $\theta$ and $T_s$ within subgroups of the membrane materials in question. Where there are differences in the membrane thickness, the comparison should be based on the calculated diffusion coefficient.

The breakthrough time $\theta$ varied within the group of all membranes studied between 4.4 min (0.08 mm polyethylene (PE)) and more than 240 min (0.07 mm polyvinyl alcohol (PVA), 0.056 mm PE/PVAE-1/PE and the like).

Disposable gloves manufactured from PE are, according to experience of the Labor Inspection's Administration of Worker Safety Regulations with Epoxy Products and Use of Them, quite common as a protection against DGEBA and other constituents. In addition, gloves of polyvinyl chloride (PVC), nitrile rubber, neoprene or natural rubber are used. The results reported above demonstrate the clear superiority of the PVAE materials over these known art materials.

Regarding laminates, one might fear that PVAE when laminated with PE, because of the "compulsory wetting" via PE, would have a shorter breakthrough time than non-laminated PVAE. It was found that the breakthrough time of DGEBA in contact with a PVAE/PE laminate was longer than 240 min, regardless of whether DGEBA was brought into contact with the PVAE or PE side of the laminate. The possible compulsory wetting effect is therefore not of essential importance.

REFERENCES CITED

1) Hansen, C. M. & Beerbower, A: Solubility parameters, p. 889-910 in Kirk-Othmer: Encycl. Chem. Techn. Suppl. Vol., 2nd Ed., Wiley & Sons, New York 1971
2) Hansen, C. M.: The three dimensional solubility parameter and solvent diffusion coefficient, Their importance in surface coating formulation, Danish Technical Press, Copenhagen 1967 (106 p.)
3) Hansen, C. M.: Solubility in the coatings industry, Färg och Lack, 17(4), 69-77(1971)
4) Hansen, C. M.: "The universality of the solubility parameter", Ind. Eng. Chem. Prod. Res. Dev., 1969 (8:1)2-11.
5) DE-Auslegeschrift 2339860
6) GB Patent 1212569
7) GB Patent 1247114
8) Klaschka, F.: Physiologische Grundlagen des Hautschutzes, Arbeitsmed. Sozialmed. Präventivmed., 15(1), 2-5(1980)
9) Linnarson, A. & Halvarson, K.: Studie av polymermaterials genomsläpplighet för organiske föreningar (FOA-Rapport C-20414-H2), Försvarets Forskningsanstalt, Stockholm 1981.

10) Hansen, C. M.: The three dimensional solubility parameter—key to paint component affinities: I. Solvents, plasticizers, polymers, and resins, J. Paint. Techn., 39(505), 104–117 (1967).

11) Beerbower, A. & Dickey, J. R.: Advanced methods for predicting elastomer/fluids interactions, ASLE Transact., 12, 1–20 (1969).

12) Kishimoto, A.: Gas barrier property and multilayer blown bottle, Jap. plast. age, 14(152), 21–25 (1976).

13) GB Patent 1489635

I claim:

1. A protective garment designed to protect the skin of the wearer against exposure to epoxides and other hazardous chemicals, which comprises a membrane shaped by extrusion or casting and/or seamed by heat sealing or sewing into a glove, coverall suit, hood or boot, said membrane comprising a substantially water insoluble polymer material comprising a copolymer of a $C_{2-5}$ alkene substituted with up to 4 hydroxy groups and a $C_{2-5}$ alkene, or a homopolymer of a $C_{3-5}$ alkene substituted with up to 4 hydroxy groups.

2. The protective garment of claim 1, wherein said garment is a glove, coverall suit or boot.

3. A protective garment as claimed in claim 1 wherein the polymer is substantially free of plasticizers.

4. A protective garment as claimed in claim 1 wherein the $C_{2-5}$ alkene is ethylene.

5. A protective garment as claimed in claim 4 wherein the polymer material is a vinyl alcohol-ethylene copolymer.

6. A protective garment as claimed in claim 5 wherein the copolymer contains 40–80 mole percent vinyl alcohol and 20–60 mole percent ethylene.

7. A protective garment as claimed in claim 1 wherein the membrane has a thickness of from 25 $\mu$m to 5000 $\mu$m.

8. A protective garment as claimed in claim 1 wherein the membrane comprises a layer of the substantially water insoluble polymer material laminated to a layer of another polymer.

9. A protective garment as claimed in claim 8 wherein the other polymer is a polyolefin.

10. A protective garment as claimed in claim 9 wherein the polyolefin is polyethylene.

11. A protective garment as claimed in 8 wherein the layer of the substantially water insoluble polymer material constitutes an intermediate layer of the laminate.

12. A protective garment as claimed in claim 11 wherein the membrane comprises a vinyl alcohol-ethylene copolymer layer laminated between polyolefin layers.

13. A protective garment as claimed in claim 12 wherein the membrane comprises a vinyl alcohol-ethylene copolymer layer laminated between polyethylene layers.

14. A protective garment as claimed in claim 8 wherein the membrane has a thickness of from 25 $\mu$m to 5000 $\mu$m.

15. A protective glove designed to protect the skin of the wearer against exposure to epoxides and other hazardous chemicals, comprising a pair of membranes, each of which comprises a vinyl alcohol-ethylene copolymer layer laminated between polyolefin layers, said membranes being cut and heat sealed to one another to define the fingers and palm of the glove.

* * * * *